Nov. 28, 1950 R. E. HERSEY 2,532,097

DECENTRALIZED LINE SWITCH ARRANGEMENT

Filed Dec. 31, 1946 5 Sheets-Sheet 1

INVENTOR
R.E.HERSEY
BY: C. Mattice
ATTORNEY

Nov. 28, 1950 R. E. HERSEY 2,532,097

DECENTRALIZED LINE SWITCH ARRANGEMENT

Filed Dec. 31, 1946 5 Sheets-Sheet 2

INVENTOR
R.E. HERSEY
BY C. Mathie
ATTORNEY

Nov. 28, 1950 R. E. HERSEY 2,532,097

DECENTRALIZED LINE SWITCH ARRANGEMENT

Filed Dec. 31, 1946 5 Sheets-Sheet 3

INVENTOR
R. E. HERSEY

BY: C. Mathie

ATTORNEY

Nov. 28, 1950 R. E. HERSEY 2,532,097

DECENTRALIZED LINE SWITCH ARRANGEMENT

Filed Dec. 31, 1946 5 Sheets-Sheet 4

INVENTOR
R.E. HERSEY
BY: C. Mattice
ATTORNEY

DECENTRALIZED LINE SWITCH ARRANGEMENT

Filed Dec. 31, 1946 5 Sheets-Sheet 5

INVENTOR
R.E.HERSEY
BY: C. Mathie
ATTORNEY

Patented Nov. 28, 1950

2,532,097

UNITED STATES PATENT OFFICE 2,532,097

DECENTRALIZED LINE SWITCH ARRANGEMENT

Ralph E. Hersey, Madison, N. J., assignor to Bell Telephone Laboratories, Incorporated, New York, N. Y., a corporation of New York Application December 31, 1946, Serial No. 719,591

7 Claims. (Cl. 179—18)

Figures 1, 6:
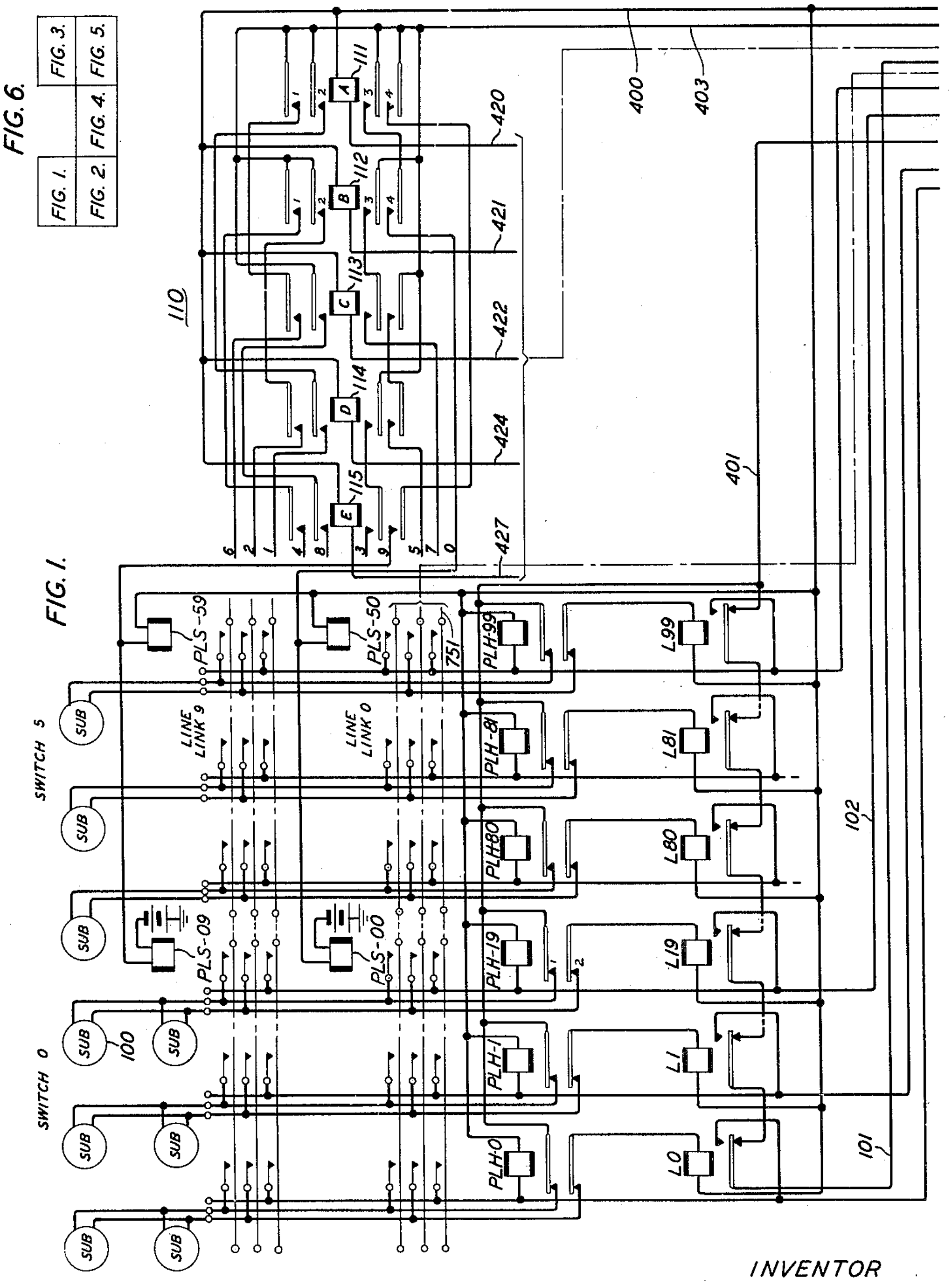

This invention relates to dial telephone systems and has for its object economy in the wiring connecting central offices with subscribers' substations.

Normally, each subscriber requires a pair of line wires to connect his substation with the central office and where the substation is located at a considerable distance from the central office, the cost of these wires is substantial. The trend toward housing developments on the outskirts of cities multiplies this cost materially.

In accordance with the present invention a group of subscribers located in proximity with one another and remote from a central office employing crossbar type switches, may be served with greater economy by placing the primary line switch, which gives access to the subscribers' lines in the subscribers' locality and using the line links to connect the local switch with the central office. Depending on the density of the traffic with a group of substations, from twenty to one hundred lines may be served by one such primary line switch and the ten line links connecting it with the secondary line switches.

According to a feature of the invention, three registers are provided at the location of the primary line switch, one to control the selection of a line link and two to control the selection of a line when called, together with means located at the central office to transmit coded signals to the registers.

One form of this invention employs a code using two out of five conductors. Using such a code, the number of wires required to serve one hundred lines is reduced from two hundred to approximately fifty.

Figure 2:
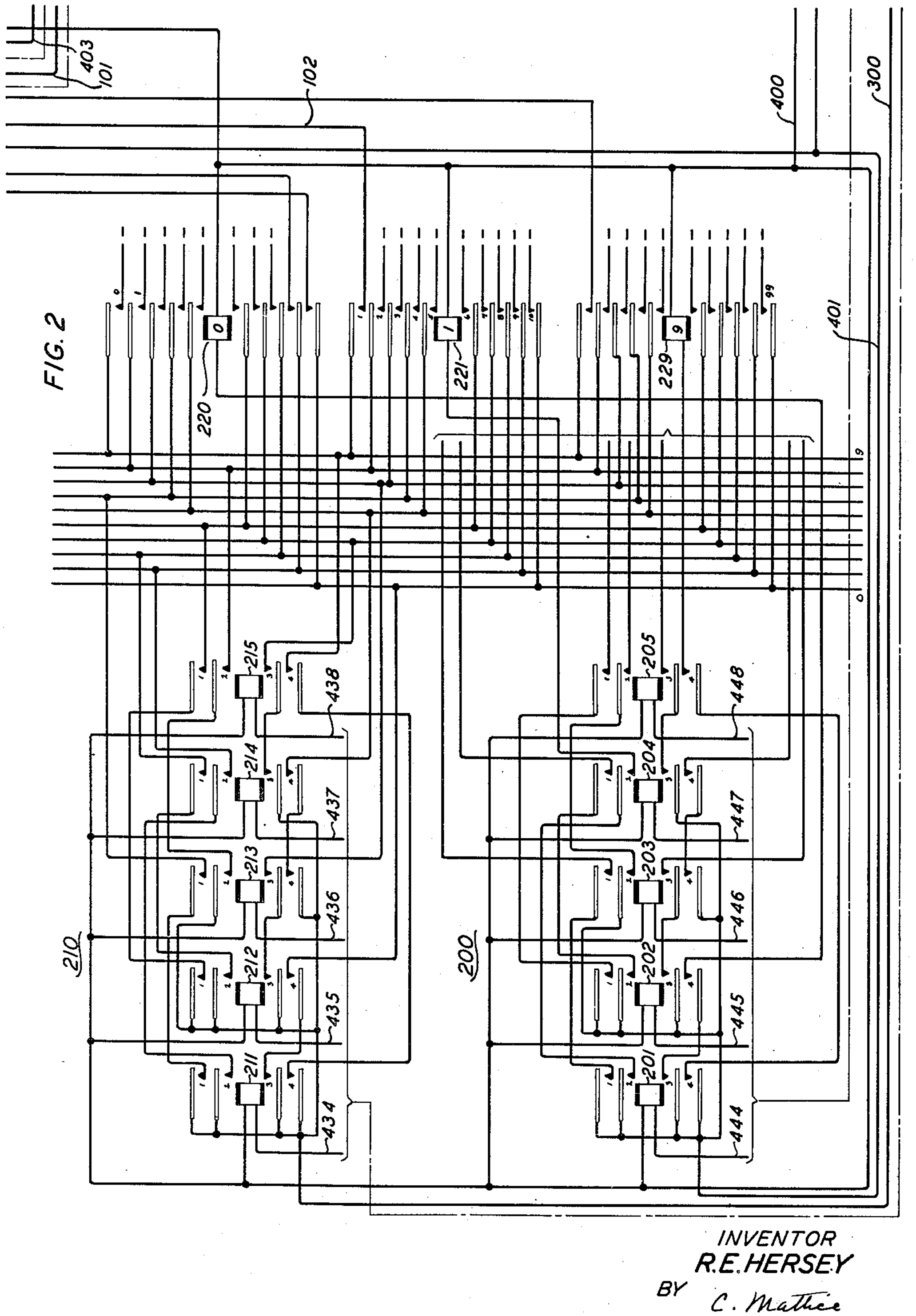
Figure 3:
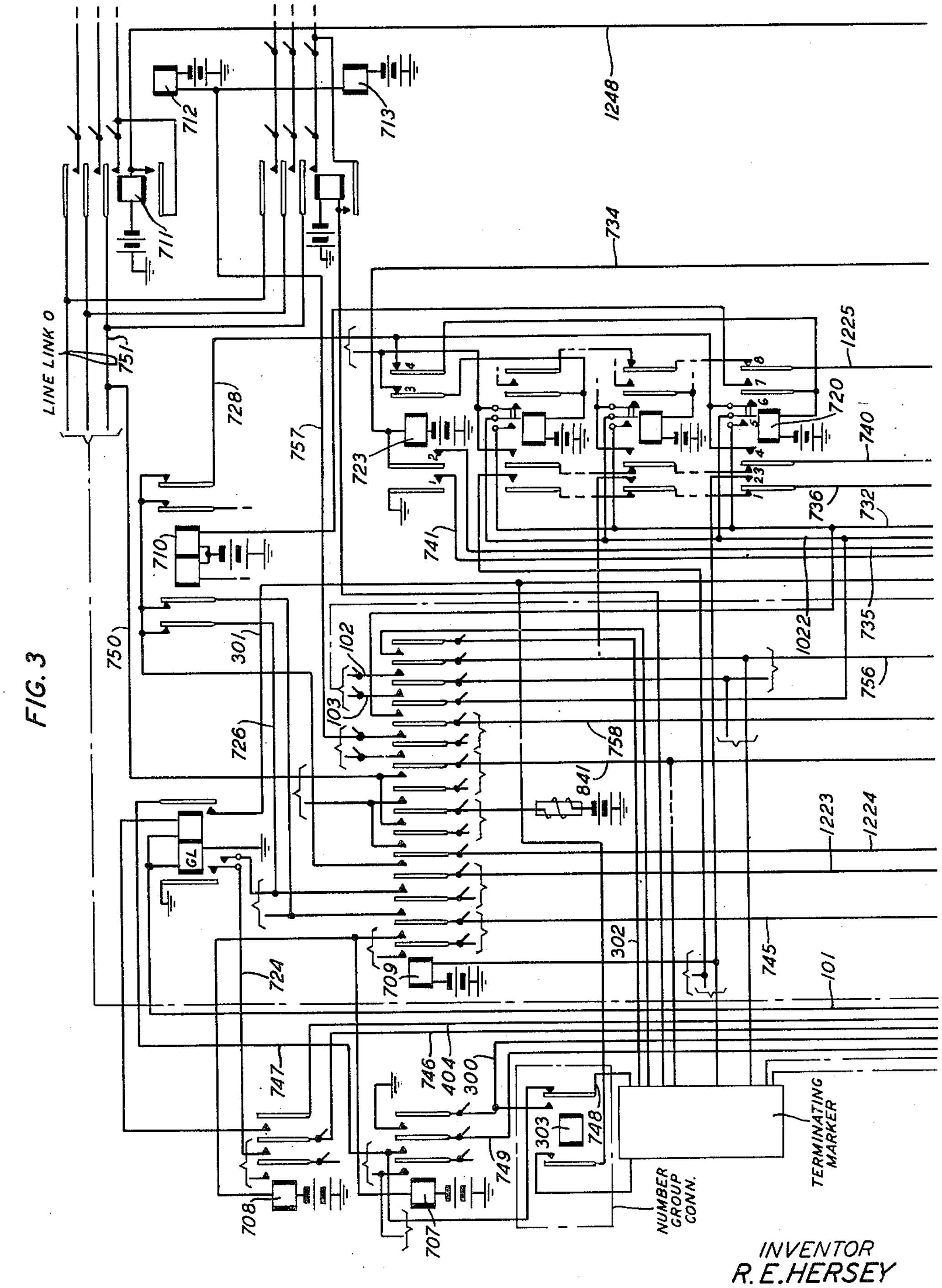
Figure 4:
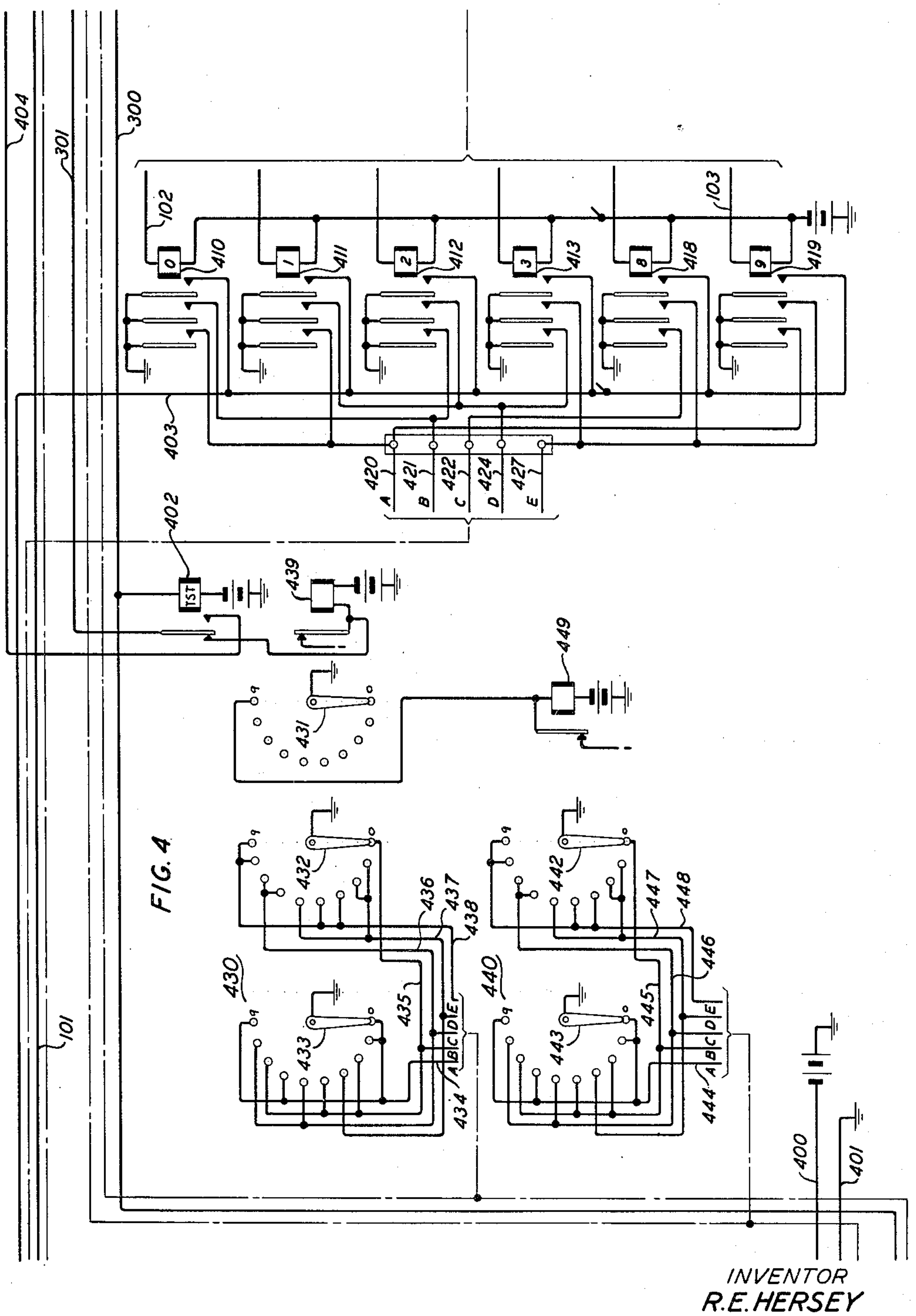
Figure 5:
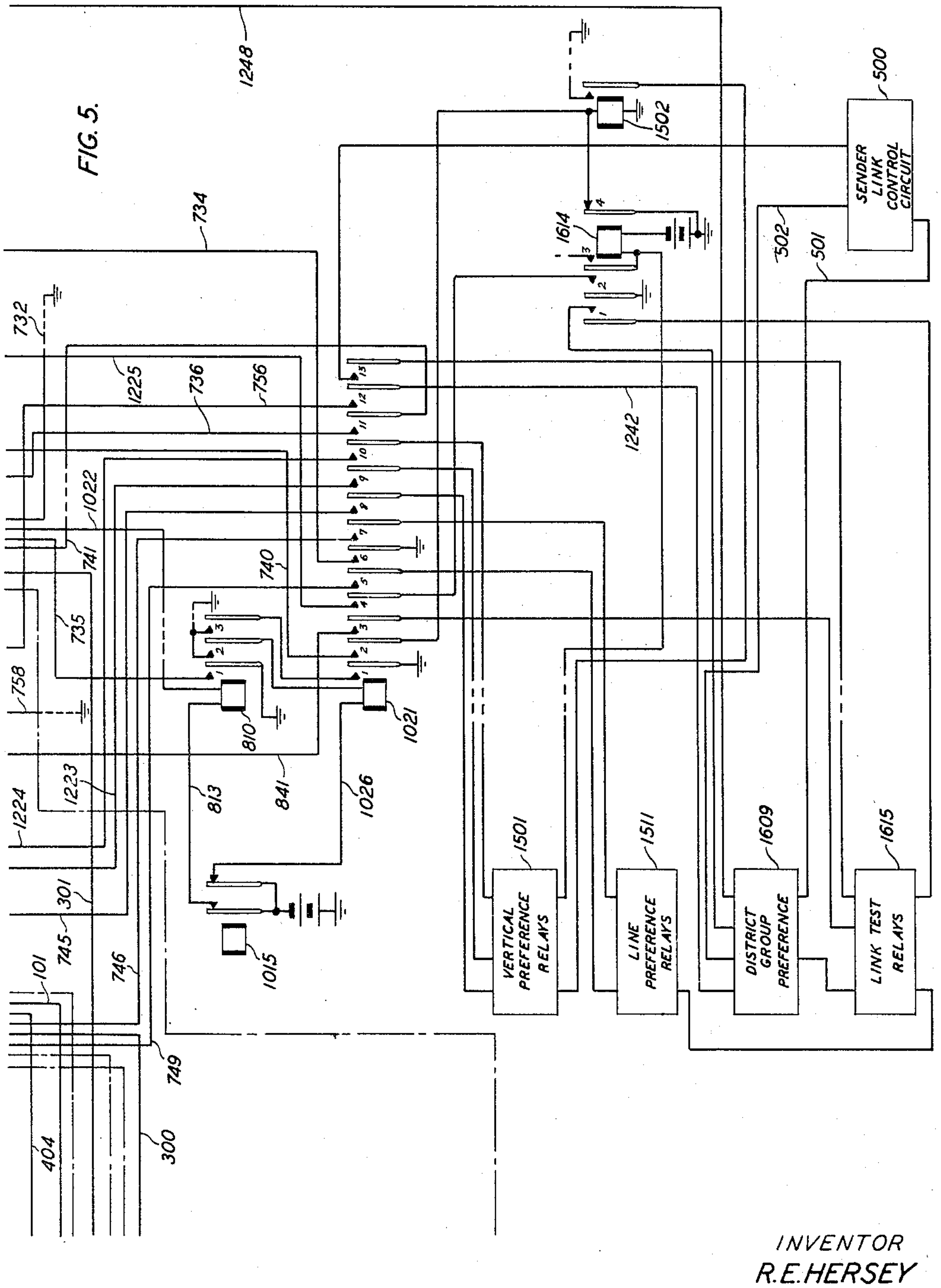

The invention will be more clearly understood from a consideration of the following description read in connection with the drawing in which:

Figs. 1 and 2 show the equipment at the local installation, or suboffice;

Fig. 1 showing a primary line switch serving one hundred lines and the line link register;

Fig. 2 showing the line, or hold magnet, selecting registers;

Figs. 3, 4 and 5 show the equipment at the central office;

Fig. 3 showing a secondary line switch and a part of the line switch control circuit;

Fig. 4 showing the code transmitting devices associated with the control circuit;

Fig. 5 showing additional parts of the control circuit; and

Fig. 6 shows the arrangement of Figs. 1 to 5 inclusive.

A conventional crossbar system is shown in United States Patent 2,224,251, granted to A. J. Busch et al. December 10, 1940. Reference is made thereto for a complete detailed disclosure and description of the line switch control circuit, the same reference numerals being used where possible, to facilitate such reference. Further reference is made to Patent 2,232,371, granted to J. W. Dehn et al., February 18, 1941, for the detailed operation of a marker in completing a terminating call.

The line switch shown in Fig. 1 comprises five switch units connected in multiple, each unit having twenty vertical sets of contacts, each vertical set being individual to a subscriber's line, which may be either a party line as shown at switch 0 or an individual line as shown at switch 5. The ten horizontal sets of contacts which connect with the ten line links are connected together through the switch units so that any line has access to any one of the ten links. Each switch unit has twenty hold magnets, one for each line, there being one hundred hold magnets, PLH—0 to PLH—99. Each unit also has ten select magnets, one for each line link but the select magnets for each link are connected in multiple. There is also a line relay for each line, relay L0 to L99.

For controlling the operation of the select magnets, a register 110 is provided comprising five relays connected to five conductors leading to the central office two of which are grounded by the control circuit at that office in accordance with a code, to provide an operating circuit for the chosen line link.

For controlling the test of a called line and operation of the corresponding hold magnet, two registers 200 and 210 are provided and operated in accordance with a two out of five code to register the tens and units digits of the location of the wanted line in the primary line switch at the suboffice. These registers connect a test and operating circuit incoming from the central office to the hold magnet of the called line.

*Originating call*

Assume that the subscriber at substation 100 initiates a call. This line is connected to the last or nineteenth set of vertical contacts in switch 0, so that the closure of the switchhook contacts completes a circuit from battery on conductor 400, supplied from the central office, winding of line relay L19, contact 2 of hold magnet PLH—19, over the switchhook contacts at substation 100, contact 1 of magnet PLH—19, over conductor 401 to ground at the central office.

The line relays L0 to L99 have their contacts arranged in a chain circuit so that only one line may control the line switches at a time. With all of the line relays normal, ground from conductor 401 is connected over the back contacts of relays L99 to L0 in series, conductor 101 to the left winding of group line relay GL and ground, holding relay GL normal. When one line relay, such as line relay L19, operates, this ground is opened and the winding of relay GL is extended over the front contact of relay L19 through the winding of the associated hold magnet PLH—19 to battery over conductor 400. The resistances of relay GL and magnet PLH—19 are so related that relay GL operates but magnet PLH—19 does not receive sufficient current to operate.

The group of lines served by the primary line switch of Fig. 1 will be assigned an arbitrary frame location and the associated group line relay GL, in operating, grounds two conductors 726 and 724 in accordance with that location, in the same manner as does the conventional line relay in the above-identified Busch et al. patent.

Ground on conductor 726 completes a start circuit for the link control circuit extending over the outer back contacts of relay 710, conductor 728, contact 4 of relay 723 to battery through the winding of start relay 720. Relay 720 operates in this circuit and locks over its contact 6 to ground on conductor 728, independent of relay 723.

Relay 720 at contact 5 closes a circuit for bringing about the connection of the link control circuit with the group circuits serving the calling suboffice. This circuit may be traced from battery at a back contact of relay 1015, conductor 813, winding of relay 810, conductor 1022, contact 5 of relay 720, conductor 732 to ground. Relay 810 closes a circuit from ground over its contact 2, winding of relay 1021, conductor 1026, to battery at the back contact of relay 1015. Relay 1021 operates and locks over contacts 2 and 3 of relay 810 to ground at its own contact 1. Relay 1021 represents a plurality of multicontact relays which serve to connect the various test and operating circuits from the line switches to the link control circuit.

With relay 1021 operated relay 720 locks over its contacts 6 and 4, conductor 740, contact 2 of relay 1021 to ground at contact 4 of relay 1614. This circuit also extends to ground through the winding of relay 1502 but relay 1502 cannot operate due to the shunt around its winding. Relay 1021 also connects ground over its contact 6 to conductor 734 and the winding of gate relay 723. Relay 723 operates, opening the operating circuit for the start relays like relay 720 and locks over its contact 2 and conductor 735 to ground at contact 1 of relay 810. At contact 1, relay 723 closes a circuit from ground over conductor 741, contact 11 of relay 1021, conductor 736, contact 2 of relay 720, to battery through the winding of relay 709 operating that relay to connect the control circuit with the horizontal level to which the suboffice has been assigned. Relay 709 closes the operating circuits for the select magnets in the secondary line switch belonging to the ten line links which serve the suboffice. One of these circuits may be traced from battery through the windings of select magnets 712 and 713, there being a separate select magnet for the incoming and outgoing parts of the secondary line switch, conductor 757, contact of relay 709, conductor 758 to ground in the control circuit. These magnets prepare all of the secondary line switches which may serve the suboffice.

Relay 709 also connects the start conductors of the suboffice and any other line groups assigned to this level through to the vertical preference relays 1501. The circuit from start conductor 726 may be traced over a contact of relay 709, conductor 1223, contact 9 of relay 1021 to the vertical preference relays 1501. These relays serve to make a record of all the line groups calling in the level identified by relay 709 and, if more than one group is calling, determine the order in which the groups will be served.

As set forth in the above-identified Busch et al. patent, since the start leads are connected together over the back contacts of relay 710, all of the vertical preference relays operate closing a circuit for operating relay 1614. Relay 1614 locks, and at contact 4 opens the shunt from the winding of relay 1502, permitting that relay to operate. At contact 2, relay 1614 closes a circuit from ground, over that contact, contact 4 of relay 1021, conductor 1225, contact 7 of relay 720 to the right winding of relay 710 and battery. Relay 710 opens the multiple connection between the start conductors, releasing the vertical preference relays which are not connected to grounded start conductors.

Assuming that the vertical position to which the suboffice has been assigned is preferred at this time, the vertical group relays 707 and 708, associated therewith, will be operated in a circuit from battery through their windings, contact of relay 709, conductor 745, contact 8 of relay 1021, through the vertical preference relay chain to ground furnished by relay 1502. Relays 707 and 708 operate, relay 708 extending the conductors grounded by the corresponding group line relays, including conductor 724, which is grounded by relay GL to the line preference relays 1511, conductor 724 extending over conductor 746 and contact 7 of relay 1021. Relay 707 connects ground to conductor 300 operating relay 402, and relays 707, 708 and 402 prepare the circuit for operating the line hold magnet at the suboffice.

In the meantime, the operation of relay 709 closes circuits for testing the line links. The test circuit for the line link shown in Fig. 3 may be traced from the sleeve conductor 751 of the line link 0, over conductor 750, contact of relay 709, conductor 841, over contact 3 of relay 1021 to the link test relays 1615. Since a busy link is characterized by ground on the sleeve conductor, only those link test relays which are connected to busy links will be operated.

Following the operation of the link test relays, the groups of district junctors to which the secondary line switches have access are tested, together with the sender links serving each group and the senders available to each sender link, as described in the above-identified Busch et al. patent. When these operations have been completed, and an individual district junctor selected, circuits are closed for operating the other switch magnets for completing the connection between the selected district junctor and the calling line.

The selection of the group of district junctors determines the secondary line switch and the line link which connects therewith. Therefore when this selection is completed, and one of the district group relays 1609 is left operated, a circuit is closed over the contact of the district group relay, conductor 1242, contact 12 of relay 1021, conductor 756, contact of relay 709, over one of the group of conductors 102, 103, etc. to the winding of one of the link select relays 410 to 419.

Each of the link select relays connects ground to two of the five code conductors 420 to 427 leading to the code relays 110 at the suboffice to transmit a signal thereto indicating the identity of the selected link. Assuming that line link 0 has been selected, relay 410 is operated, grounding conductors 420 and 421 and operating relays 111 and 112 at the suboffice. Relay 410 also grounds conductor 403 leading to the suboffice to complete a circuit over contact 3 of relay 111, contact 4 of relay 112 through the windings of select magnets PLS—00, PLS—50, etc. to battery on conductor 400. Magnets PLS—00, PLS—50, etc. prepare the primary line switch for operation.

When the sender link is ready for operation, the sender link control circuit 500 supplies ground over conductor 501 to the district group preference relays 1609 and under the control of the operated relay to conductor 1248 and battery through the winding of hold magnet 711 of the secondary line switch. Magnet 711 closes the cross-point connecting line link 0 to the selected district junctor.

When all the other magnets have operated and have been checked in the control circuit as described in the Busch et al. patent, the circuit for operating the line hold magnet is closed. Ground is supplied from the sender link control circuit over conductor 502 through the district group preference relays, the link test relays, and the line preference relays, contact 5 of relay 1021, conductor 749, contact of relay 707, conductor 747, front contact of the group line relay GL, conductor 301, front contact of relay 402, conductor 404, front contact of relay 708 to the right winding of relay GL, connecting that winding, which has a low resistance, in parallel with the high resistance left winding of relay GL and thereby reducing the resistance in series with hold magnet PLH—19 to permit that magnet to operate.

Magnet PLH—19 when operated closes the cross-points connecting the calling line 100 with line link 0 and locks over the sleeve conductor 751 to ground supplied by the sender and later by the district junctor. At its auxiliary contacts, magnet PLH—19 opens the circuit of line relay L19 and that relay releases, opening the circuit of the group line relay GL.

The release of the line link and sender link control circuits takes place as described in the Busch et al. patent referred to above, thereby releasing relays 410, 111 and 112.

As soon as line relay L19 releases, some other line at the suboffice may originate a call, which will be handled in the manner described, except that, since line link 0 is in use, some other link will be selected for extending the second call. In this way, as many as ten conversations may take place simultaneously between the suboffice and other lines.

*Terminating call*

In the case of a terminating call, the primary and secondary line switches are operated under the control of a terminating marker. As described in the Dehn et al. patent, identified above, when the number of the called line is registered in the marker, the marker normally obtains from the number group connector an indication of the busy or idle condition of the line, of the line switch frame on which the line is located and of the location of the line on the frame. Since the lines at a suboffice do not extend to the central office, when the number group connector receives the number of such a line it operates a relay such as relay 303 which connects the line test conductor 748 to conductor 300 and the winding of relay 402, thus always giving an idle indication for such lines. It transmits to the marker an indication of the frame on which the line links and secondaray line switches appear and the arbitrary apparent location assigned to the primary line switch at the suboffice. In addition it sets up a registration in the line link control circuit in accordance with the location of the line at the suboffice. For convenience the means for receiving this registration has been shown as two impulse-operated, rotary switches, but it is obvious that any other convenient form of registers might be used. Relay 303 closes a circuit from an impulse transmitter controlled by the marker to conductor 301 and over the back contact of relay 402 to the winding of magnet 439. Magnet 439 operates in response to each pulse, advancing switch 430, and operating magnet 449 each time that brush 431 reaches position 9.

Having received the identity of the line switch frame, the marker tests whether the line link control circuit is busy and if it is idle the marker seizes it and operates relay 709 which is individual to the group of line links serving the suboffice. As on an outgoing call, relay 709 operates the select magnets 712 and 713 associated with the secondary line switches in which the group of line links terminate. Relay 709 also connects the sleeve conductors of the line links to the marker to enable that circuit to test the line links as part of the channels connecting the incoming trunk with the called line and to operate the select magnet of the chosen link as described for an outgoing call.

Assuming that line 100, is called, which line occupies position 19 on the line switch at the suboffice, switch 440 will have been advanced to position 1 and switch 430 to position 9. With switch 440 in position 1, brush 442 grounds conductor 447 and brush 443 grounds conductor 444 leading to the suboffice. Similarly with switch 430 in position 9, brush 432 grounds conductor 438 and brush 433 grounds conductor 434 leading to the suboffice.

At the suboffice, ground on conductors 444 and 447 operates relays 201 and 204 in the tens register 200. With these relays operated, a circuit is closed from ground on conductor 401 over contact 2 of relay 201, contact 2 of relay 204 to the winding of relay 221 and battery on conductor 400. Relay 221, representing the tens digit of the line location prepares circuits for the hold magnets of the group of ten lines having locations 10 to 19. Ground on conductors 434 and 438 operates relays 211 and 215 in the units register 210. With these relays operated a circuit is closed from the winding of hold magnet PLH—19, conductor 102, contact 1 of relay 221, contact 4 of relay 215, contact 4 of relay 211, conductor 300, front contact of relay 303, conductor 748 to the marker test circuit. The winding of hold magnet PLH—19 extends to battery on conductor 400, so that, if the line is idle, the marker receives battery over the above circuit. However, if the line is busy, the hold magnet is held operated over the sleeve contact of the operated line switch cross-point to low resistance ground applied over the sleeve conductor of the associated line link. This low resistance ground is connected to conductor 102 in shunt of the battery through the hold magnet winding and gives the marker a busy indication.

As set forth in the above-identified Dehn et al. patent the marker, even after having received an idle indication on its initial test of a line, maintains a test of the line until it is ready to operate the line hold magnet. If the line becomes busy during this supplementary test the marker responds to transmit a busy signal to the calling line. In the case of a suboffice line, the supplementary test serves to signal the busy condition of the line.

Assuming that line 100 is idle, no such signal is received, and the marker, when ready, transfers conductor 748 to the hold magnet operating ground, operating magnet PLH—19, which locks over the sleeve contact of the prepared cross-point to ground supplied by the incoming junctor.

The switch registers may be restored by a self-interrupting circuit in the well-known manner, when the line link control circuit is released thereby restoring the suboffice registers 200 and 210 in preparation for a subsequent call.

What is claimed is:

1. In a telephone system, a central office, a group of subscribers' lines, a line relay individual to each of said lines, a crossbar switch serving said subscribers' lines and located at a distance from said central office, a plurality of equivalent trunks connecting said switch with said central office, means associated with said switch for operating said switch, means in said central office for selecting an idle one of said trunks and for controlling said switch operating means to connect one of said lines with said central office over selected trunk, means to operate said selecting and controlling means under the control of one of said line relays, means at said central office to register the designation of one of said lines, and means to operate said selecting and controlling means under the control of said registering means.

2. In a telephone system, a central office, a group of subscribers' lines, a crossbar switch serving said subscribers' lines and located at a distance from said central office, a plurality of trunks connecting said switch with said central office, means associated with said switch responsive to the initiation of a call on one of said lines for identifying said group of lines to said central office, means in said central office for selecting an idle one of said trunks and means under the joint control of said calling line and said central office for operating said switch to connect said calling line with said central office.

3. In a telephone system, a central office, a group of subscribers' lines, a crossbar switch serving said subscribers' lines and located at a distance from said central office, a plurality of trunks connecting said switch with said central office, select magnets for said switch individual to said trunks, hold magnets for said switch individual to said lines, said switch responsive to the successive operation of one select magnet and one hold magnet to connect the associated line and trunk, a line relay for each line, means responsive to the operation of one of said line relays by a calling line for identifying said group of lines to said central office, means in said central office responsive to said identification for selecting an idle one of said trunks, a register associated with said select magnets, means under the control of said selecting means to transmit the identity of said selected trunk to said register, means under the control of said register to operate the select magnet individual to said selected trunk and means under the control of said central office and said line relay for operating the hold magnet individual to the calling line.

4. In a telephone system, a central office, a group of subscribers' lines, a crossbar switch serving said subscribers' lines and located at a distance from said central office, a plurality of trunks connecting said switch with said central office, select magnets for said switch individual to said trunks, hold magnets for said switch individual to said lines, said switch responsive to the successive operation of one select magnet and one hold magnet to connect the associated line and trunk, a line relay for each line, means responsive to the operation of one of said line relays by a calling line for identifying said group of lines to said central office, means in said central office responsive to said identification for selecting an idle one of said trunks, a register associated with said select magnets, means under the control of said selecting means to transmit a code signal representing the identity of said selected trunk to said register, means under the control of said register to operate the select magnet individual to said selected trunk and means under the control of said central office and said line relay for operating the hold magnet individual to the calling line.

5. In a telephone system, a central office, a group of subscribers' lines, a crossbar switch serving said subscribers' lines and located at a distance from said central office, a plurality of trunks connecting said switch with said central office, select magnets for said switch individual to said trunks, hold magnets for said switch individual to said lines, said switch responsive to the successive operation of one select magnet and one hold magnet to connect the associated line and trunk, a terminating marker, means responsive to the registration of the designation of one of said subscriber's lines in said marker to connect said marker with said trunks, means in said marker to select an idle one of said trunks, a first register associated with said select magnets, means in said marker to transmit the identity of said selected trunk to said first register, means under the control of said first register to operate the select magnet individual to said selected trunk, a second register, means in said marker to transmit the identity of the wanted line to said second register and means under the control of said marker and said second register to operate the hold magnet of the wanted line.

6. In a telephone system a central office, a group of subscribers' lines, a crossbar switch serving said subscribers' lines and located at a distance from said central office, a plurality of trunks connecting said switch with said central office, select magnets for said switch individual to said trunks, hold magnets for said switch individual to said lines, said switch responsive to the successive operation of one select magnet and one hold magnet to connect the associated line and trunk, a terminating marker, means responsive to the registration of the designation of one of said subscriber's lines in said marker to connect said marker with said trunks, means in said marker to select an idle one of said trunks, a first register associated with said select magnets, means in said marker to transmit a code signal representing the identity of said selected trunk to said first register, means under the control of said first register to operate the select magnet individual to said selected trunk, a second register, means in said marker to transmit a code signal representing the identity of the wanted line to said second register and means under the control of said marker and said second register to operate the hold magnet of the wanted line.

7. In a telephone system, a central office, a group of subscribers' lines, a crossbar switch serving said subscribers' lines and located at a distance from said central office, a plurality of trunks connecting said switch with said central office, select magnets for said switch individual to said trunks, hold magnets for said switch individual to said lines, said switch responsive to the successive operation of one select magnet and one hold magnet to connect the associated line and trunk, a line relay for each line, a control circuit at said central office responsive to the operation of one of said line relays, a marker at said central office responsive to the registration therein of the designation of one of said lines, a first register associated with said select magnets, means in said control circuit and said marker for selecting an idle trunk and transmitting the identity of said selected trunk to said first register, means under the control of said first register for operating the select magnet individual to said selected trunk, a second register associated with said hold magnets, means in said marker to transmit the identity of a wanted line to said second register, means under the joint control of said control circuit and a line relay to operate the hold magnet of a line to connect a calling line with a selected trunk and means under the joint control of said marker and said second register to operate the hold magnet of a line to connect a called line with a selected trunk.

RALPH E. HERSEY.

REFERENCES CITED

The following references are of record in the file of this patent:

UNITED STATES PATENTS

| Number | Name | Date |
|---|---|---|
| 1,567,265 | Hinrichsen | Dec. 29, 1925 |
| 1,593,387 | Clark | July 20, 1926 |
| 2,164,731 | Bascom | July 4, 1939 |
| 2,351,766 | Joel | June 20, 1944 |